US007287204B2

(12) United States Patent
Mayer et al.

(10) Patent No.: US 7,287,204 B2
(45) Date of Patent: Oct. 23, 2007

(54) MEMORY UNIT TEST

(75) Inventors: Frank Mayer, Uttenreuth (DE); Kamal Merchant, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 171 days.

(21) Appl. No.: 10/494,794

(22) PCT Filed: Oct. 30, 2002

(86) PCT No.: PCT/DE02/04046

§ 371 (c)(1), (2), (4) Date: May 5, 2004

(87) PCT Pub. No.: WO03/043022

PCT Pub. Date: May 22, 2003

(65) Prior Publication Data

US 2004/0268191 A1 Dec. 30, 2004

(30) Foreign Application Priority Data

Nov. 12, 2001 (DE) ................................ 101 55 531
Feb. 14, 2002 (DE) ................................ 102 06 189

(51) Int. Cl.
*G11C 29/00* (2006.01)

(52) U.S. Cl. ...................... 714/719; 714/718; 714/722; 365/201

(58) Field of Classification Search ..................... None
See application file for complete search history.

(56) References Cited

U.S. PATENT DOCUMENTS 3,163,848 A * 12/1964 Abramson .................. 714/761
4,672,609 A 6/1987 Humphrey et al.
4,701,916 A * 10/1987 Naven et al. ................. 714/30
4,903,266 A * 2/1990 Hack .......................... 714/719
5,173,906 A * 12/1992 Dreibelbis et al. .......... 714/733
5,222,066 A * 6/1993 Grula et al. ................ 714/718
5,258,985 A * 11/1993 Spence et al. ............. 714/732
5,321,706 A * 6/1994 Holm et al. ................ 714/805
5,357,521 A * 10/1994 Cheng et al. .............. 714/720
5,457,696 A * 10/1995 Mori .......................... 714/720
5,673,270 A * 9/1997 Tsujimoto .................. 714/718

FOREIGN PATENT DOCUMENTS

DE 26 55 653 A1 6/1978
DE 36 35012 C1 2/1988
DE 100 37 992 A1 2/2002
EP 0 643 350 A1 3/1995
EP 1 178 321 A2 2/2002
JP 03 048 347 3/1991
WO WO98/09218 3/1998

OTHER PUBLICATIONS

IBM Corp., "Error Detection Method for RAM with Stuck Output Latches", IBM Technical Disclosure Bulletin, vol. 33, No. 7, IBM Corp., New York, US, Dec. 1990, pp. 157-158.

* cited by examiner

*Primary Examiner*—Guy Lamarre
*Assistant Examiner*—Steve Nguyen

(57) ABSTRACT

The invention relates to a method and device for operating and/or testing memory units, which make it possible to conduct a time-saving test of semiconductor memories during running operation. The inventive method for testing memory units having storage locations provides that, for the storage locations, a first item of test information is formed according to a variable parameter assigned to the respective storage location and according to the contents of the respective storage location.

12 Claims, 4 Drawing Sheets

MEMORY UNIT TEST

CROSS REFERENCE TO RELATED APPLICATIONS

This application is the US National Stage of International Application No. PCT/DE02/04046, filed Oct. 30, 2002 and claims the benefit thereof. The International Application claims the benefits of German application No. 10155531.8 filed Nov. 12, 2001 and of German application No. 10206189.0 filed Feb. 14, 2002, all three of the applications are incorporated by reference herein in their entirety.

FIELD OF INVENTION

The invention relates to a method and a device for testing and/or operating semiconductor memories having storage locations.

The invention relates to a method and a device for testing and/or operating semiconductor memories having storage locations, in particular memory units in error-protected systems, which operate for quite long periods without interruption. With such error-protected systems hardware errors generally have to be detected during running operation.

BACKGROUND OF INVENTION

Memory units for binary signals are among the most important functional units of digital information processing systems. They are used for example as program and data memory units in digital computers, measuring devices, as code converters and generally for producing combinational logic circuits. A digital memory unit is an arrangement of a plurality of storage locations, which are organized so that every storage location can be accessed from outside. In what is known as a word-organized memory unit all the bits of a word can be addressed simultaneously and read or input in parallel. In the case of a k-bit word therefore, all the k bits of a word are considered to be a storage location. Unless-otherwise stated, a storage location below always refers to a k-bit long word. When only one bit is addressed at a time, it is referred to as bit organization.

The former application DE 100 37 992 describes an online test concept, with which hardware is tested in blocks at regular intervals during operation. Time intervals are predefined for this, in which the hardware is tested in cycles and then the original state is restored, before functional operation is continued. The described concept for example allows online testing of state machines (FSM=Finite State Machine) and what is known as random logic.

SUMMARY OF INVENTION

The object of the invention is to make it possible to conduct a time-saving test of semiconductor memories during running operation.

This object is achieved by a method for testing and/or operating memory units with storage locations, with which, for the storage locations, a first item of test information is formed according to a variable parameter assigned to the respective storage location and according to the content of the respective storage location.

This object is achieved by a device with memory units with storage locations, whereby the storage locations are each assigned a first item of test information according to a variable parameter assigned to the respective storage location and according to the content of the respective storage location.

The object is based on the knowledge that the effectiveness of a memory unit test can be significantly increased by relatively simple measures relating to circuit technology by using a variable parameter to form an item of test information for storage locations. The inventive method and the inventive device allow the detection of errors during the address, write, store and read processes. Unlike hitherto known memory unit tests, the time required for the test is proportional to the number of storage locations n multiplied by $m=\log_2 n$ and does not increase quadratically with the address space n. As the size of the memory unit increases, the inventive algorithm can be used very profitably, as the time required for the test decreases significantly compared with previous methods, as the memory unit increases, but addressing errors are still detected.

In one advantageous embodiment of the invention the memory unit test is carried out in one or a plurality of test cycles. For effective error detection, in particular for the detection of addressing errors, it is proposed that a basic test be carried out across all the storage locations in the first phase of each test cycle. During the basic test the content of each of the storage locations is read and the storage locations are rewritten with this content, extended in each instance to include a first item of test information, whereby this first item of test information is formed according to a variable parameter assigned to the respective storage location and the previously read content of the respective storage location. In a second phase of the test cycle, after all storage locations have been read and rewritten according to the first phase, the content of the storage locations is read again, a second item of test information is determined from this content read in the second phase and the second item of test information is compared with the stored first item of test information.

The first phase of the inventive memory unit test can advantageously also be used to write and read storage locations to detect errors in the write, read and store processes, in particular to detect coupling errors within a storage location (known as horizontal coupling errors). The memory unit is returned to the same state as before the memory unit test, when, according to a further embodiment of the invention, the storage locations are each written with the content read in the first phase at the end of a basic test cycle of the basic test.

The above-mentioned variable parameter assigned to a storage location can be configured as variable parity. Parity represents the simplest and, as far as information rate is concerned, the most effective coding. One hundred percent of one-bit errors can be detected with parity. If the variable parameter is configured as variable parity, an additional bit (known as a parity bit) is formed as the first item of test information according to the variable parity assigned to the respective storage location and according to the content of the respective storage location. The parity bit is formed so that the total number of one-bits of the content of the respective storage location extended to include the parity bit is even (in the case of even variable parity) or odd (in the case of odd variable parity). The storage location is written in the first phase with the content extended to include the parity bit. In the second phase a second item of test information is determined from the reread content of the storage locations and, when variable parity is used, this is configured as a variable parity bit, i.e. as information indicating whether the total number of one-bits of the content read in the second phase is even or odd.

The inventive method can in particular be used to detect coupling errors, whereby a coupling error is characterized by the incorrect assignment of one or a plurality of storage locations to a memory unit address. Coupling errors can be detected particularly easily, when a number of test cycles corresponding to the number of address bits of the memory unit address represented in a binary manner is provided and a different address bit is used in each test cycle to form a variable item of test information or variable parity. In order also to detect errors, with which the coupled storage location has a higher address than the coupling location, it is proposed that in a first segment of a test cycle the storage locations be tested in ascending order according to their memory unit addresses and in a second segment of the test cycle the storage locations be tested in descending order according to their memory unit addresses.

If a variable parity is also used in functional operation, software with access to the memory unit would always have to carry the address bit defining parity with it and use it to determine current parity. This problem can be avoided, if during read access to a storage location with a memory unit address, a fixed parity bit is formed by means of an ex-or link of one parity-defining address bit of the respective memory unit address to the first item of test information of the respective storage location and during write access to the storage location, the first item of test information is formed by means of an ex-or link of the fixed parity bit to the parity-defining address bit. In other words a variable parity bit is used internally but during read access a fixed parity is made available externally and during write access the fixed parity supplied by the software is converted internally to variable parity.

For hardware with dual-channel architecture the probability of error detection can be increased, if for testing memory units with storage locations on at least two different units one access data signature is formed in each instance and the formed signatures are compared with each other for error detection.

The inventive method can advantageously also be used as a build-in self test (BIST) during production of a memory unit and/or during the power-on test of a memory unit.

BRIEF DESCRIPTION OF THE DRAWINGS

The invention is described in more detail and explained below with reference to the exemplary embodiments shown in the Figures, in which.

DETAILED DESCRIPTION OF INVENTION

The individual stages of a method for testing memory units and the components of a device with memory units are described in more detail below with reference to the drawings. Unless otherwise stated, the term memory unit is used to refer to static semiconductor memories having random access, also referred to as read-write memory units (RAM=Random Access Memory) and/or read-only memory units (ROM=Read Only Memory).

The incorporation of a memory unit test in an online test requires a certain amount of time and organization. The pertinent standards (DIN 19250/19251, DIN 0801, DIN 0801/A1 and IEC 61508) define requirement classes or require error detection during the following processes:

Address

Write

Store

Read

Unlike address errors, the other three types of error (write, store and read) can be detected with relatively simple hardware structures and algorithms. In the case of address errors, the detection of multiple addressing and coupling errors is relatively time-consuming. The other three types of error will therefore be considered first and a basic test concept will be presented for detection of such errors with reference to FIG. 1 and FIG. 2. Additional measures then have to be implemented depending on the requirements of the required security level (AK or SIL).

Figure 1:
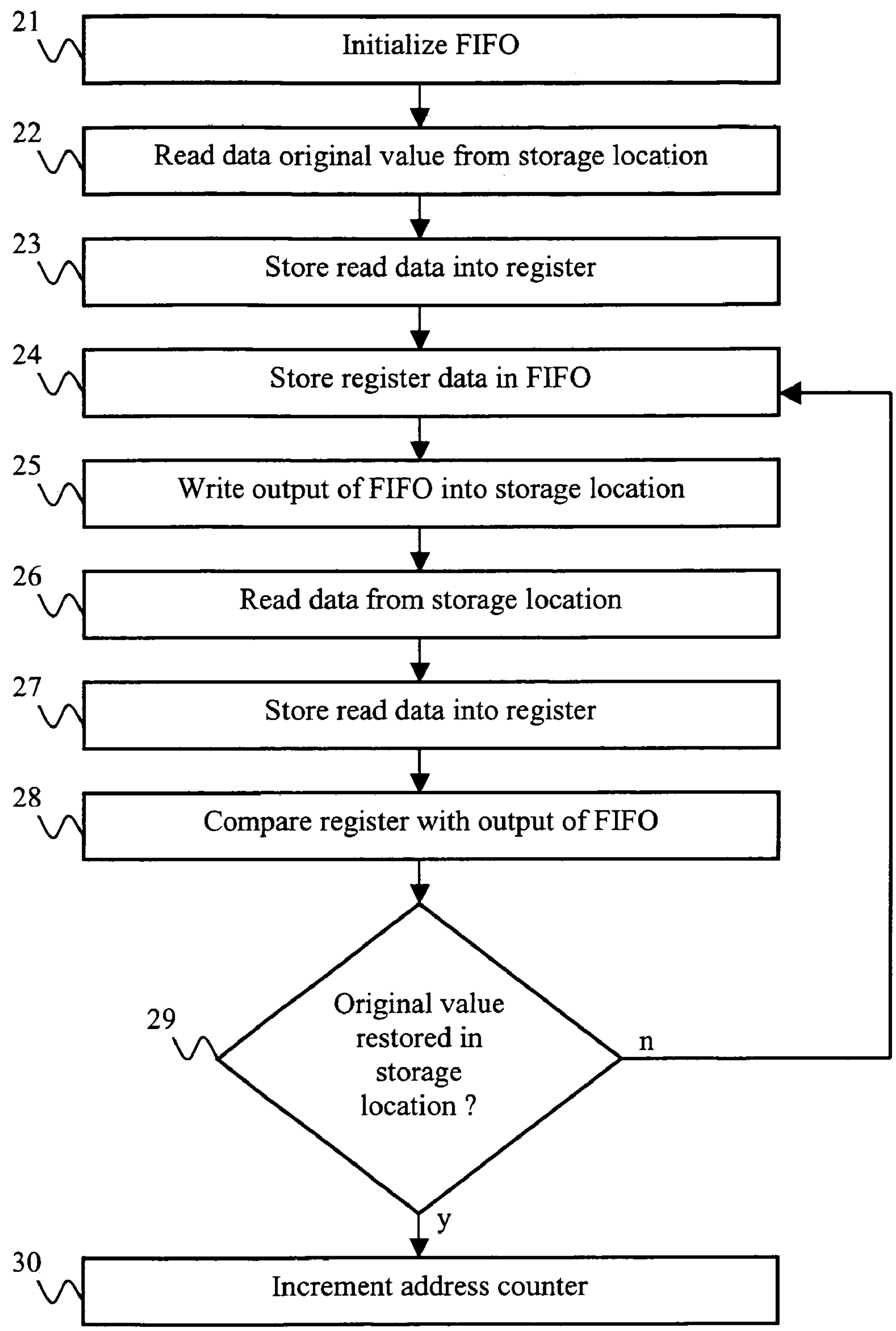
FIG. 1 shows a basic test cycle for testing a storage location.

FIG. 1 shows the individual stages 21 to 30 of a basic test cycle of the basic test concept. Within the basic test cycle a storage location 1 is tested for errors in the write, store and read processes. The basic test cycle starts with initialization 21 of a FIFO (FIFO=First In First Out memory unit). In the next stage 22 the content of the storage location 1 to be tested is read and in a further stage 23 said content is stored in a latch 8 (latch=register). In digital technology a latch is understood to mean an arrangement of bistable switching elements (flip-flops), which are used to receive information, store it temporarily and then release it again. Unlike the individual RS flip-flop this information may comprise not only one bit but also a data word with a plurality of bits. In stage 24 the content of the latch 8, the read data, is stored in the FIFO and in stage 25 the output of the FIFO is written into the storage location 1. In the next stage 26 the storage location 1 is read again and in stage 27 the read data is once again written into the latch 8. In stage 28 the read data in the latch 8 is compared with the output data of the FIFO. Depending on whether in stage 29 the original content of the storage location 1 is restored or not (as a function of the FIFO depth used), the method now proceeds directly to stage 30 or the process is repeated from stage 24. Stage 30 comprises the incrementing of the address counter. After incrementing the address counter indicates the next storage location to be tested in a subsequent basic test cycle, which in turn comprises the corresponding stages 22 to 30. The first stage 21 is superfluous when the basic test cycle is repeated, as the FIFO has already been correctly initialized by carrying out the previous basic test cycle.

Figure 2:
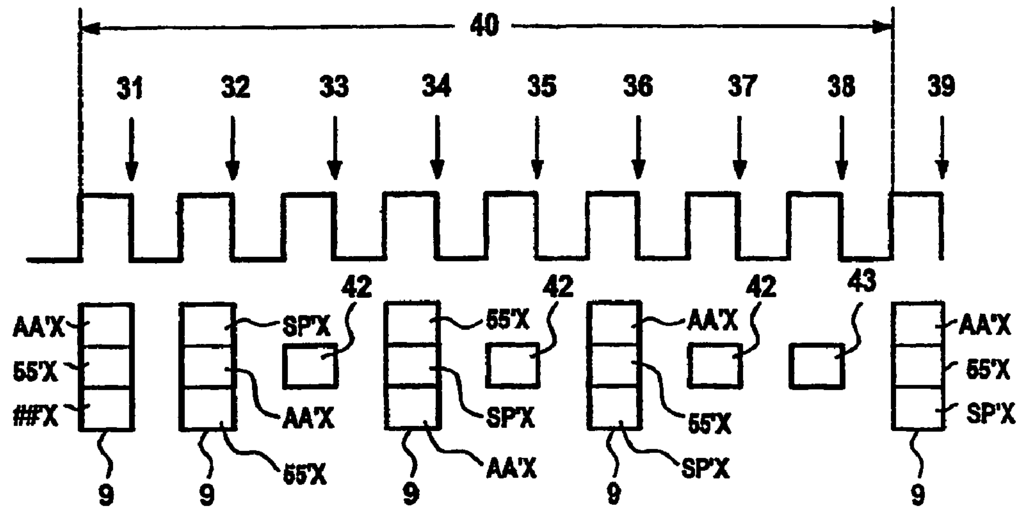
FIG. 2 shows a basic test cycle using the example of a 3*k-bit FIFO.

FIG. 2 shows the process according to FIG. 1 using the example of a 3*k-bit FIFO 9. For purposes of simplicity a synchronous, static and unidirectional memory unit is considered first, which is organized by bytes (i.e. k=8). FIG. 2 shows a complete basic test cycle 40 for this purpose, executed within eight individual clock pulses 31 to 38. Each storage location 1 can be fully verified in respect of the write, store and read processes with six memory unit access operations, three writing and three reading. In the case of a k-bit word, all the k bits of a word are considered to be a storage location. At the end of the test the original location content (i.e. the functional data) is restored. The write data is essentially obtained from the FIFO 9 and the read data is transferred to the FIFO 9. Before the start of the actual test the FIFO is initialized, i.e. the top two FIFO levels are prefilled with the contents AA'X or 55'X. If k≠8 the top two levels are correspondingly filled with the bit patterns "1010 . . . " Or "0101 . . . ".

The lowest level contains a random data ##'X. The storage location 1 contains the content SP'X at the start. The suffix 'X here is intended to characterize a hexadecimal number. The entire basic test cycle 40 requires a total of eight clock pulses 31 to 38 to test, one storage location 1. The processes during the individual clock pulses 31 to 38 are described below. In the first clock pulse 31 the original content SP'X of the storage location 1 is read and transferred to the latch 8 at the output of the memory unit 2. The content of the FIFO 9 corresponds to initialization. In the second clock pulse 32 the read content SP'X is transferred from the latch 8 to the FIFO 9. In the same clock pulse 32 the output data 55'X of the FIFO 9 is written into the storage location 1. In the following third clock pulse 33 the last written data 55'X is again read from the storage location and stored in the latch 8. The read data 55'X is compared with the output data of the FIFO 9 and both should have the same value. The comparison process is marked in FIG. 2 in each instance with the reference character 42. In the fourth clock pulse 34 the read data 55'X is transferred from the latch 8 to the FIFO 9. The now current output data AA'X of the FIFO 9 is also written into the storage location 1 in the fourth clock pulse 34. The last written data AA'X is again read from the storage location 1 in the fifth clock pulse 35 and stored in the latch 8. The value in the latch 8 is compared with the output data AA'X of the FIFO 9 and both ideally have the same value. In the sixth clock pulse 36 the read data AA'X is transferred from the latch to the FIFO 9. The output data of the FIFO 9, which now represents the original memory unit content SP'X read from the storage location 1 in the first clock pulse 31 is written back into the storage location 1. The last written data SP'X from the storage location is read again in the seventh clock pulse 37 and stored in the latch 8. The content of the latch 8 is compared with the output data SP'X of the FIFO 9 and both contain the original data SP'X read from storage location 1.

In the eighth clock pulse 38 the address counter, which addresses the storage location 1, is finally incremented by one (marked with the reference character 43). The test hardware is now ready to test the next storage location (clock pulse 39). The stages listed here can be implemented relatively easily with a state machine (FSM=Finite State Machine). Verification of the storage location 1 is actually terminated in the sixth clock pulse 36 and the original memory unit state restored. In the seventh clock pulse 37 the original memory unit content is read for the second time and compared with the memory unit content SP'X read in the first clock pulse 31. In this way it is possible to verify n storage locations in 8*n clock pulses. Here n represents the entire address space. With m address bits, $n=2^m$.

Figure 3:
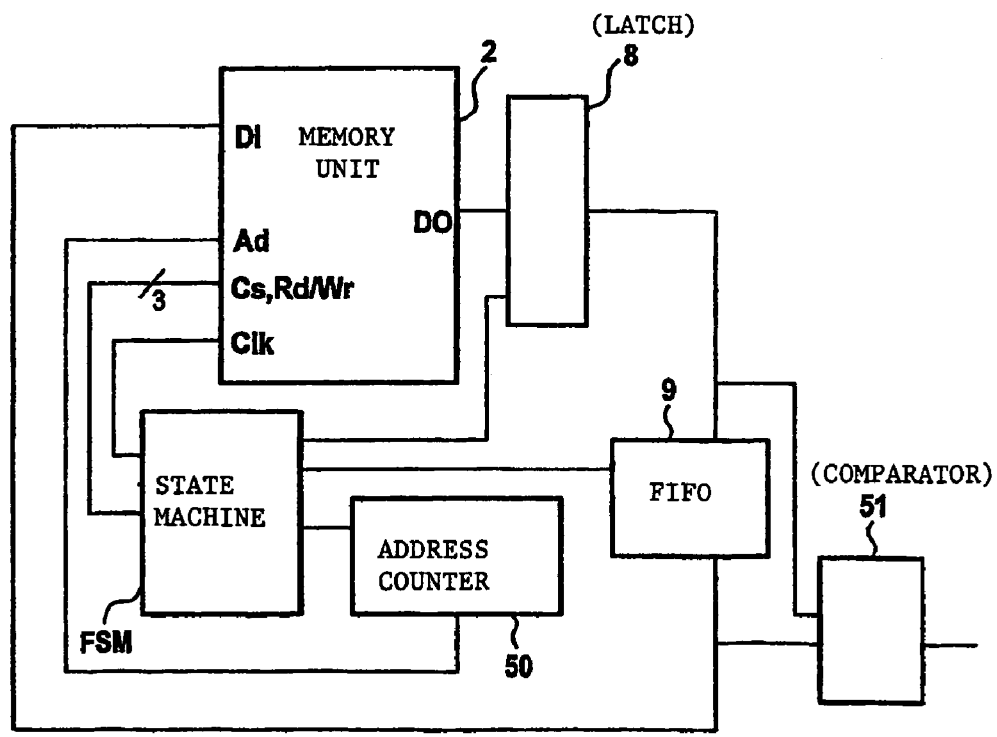
FIG. 3 shows a hardware architecture for a basic test cycle.

FIG. 3 shows the hardware architecture necessary to test a storage location. It shows a memory unit 2, which contains n storage locations each with k bit. The memory unit 2 has a data input DI, an addressing input Ad, a trigger or clock input Clk and the inputs Cs, Rd/Wr, which are provided for accessing the control signals chip select (CS), write access (Wr) and read access (Rd). The memory unit can output data via the data output DO to a k-bit latch 8. A state machine FSM controls the memory unit test. An individual storage location is addressed via an address counter 50. A 3*k-bit FIFO 9 is used to buffer the read data and data to be read in. The data from the latch 8 and FIFO 9 is compared using a comparator 51.

Figure 4:
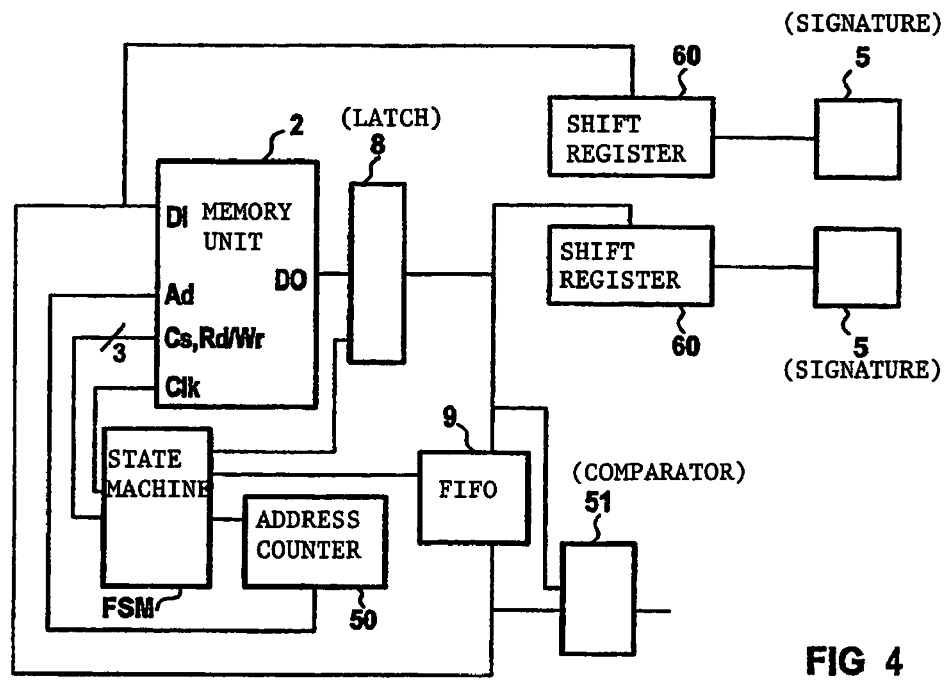
FIG. 4 shows the formation of an access data signature in a dual-channel architecture.

FIG. 4 shows an exemplary embodiment of a memory system with dual-channel architecture. With dual-channel architecture access data signatures 5 can also be formed at little cost. A comparison of the signatures 5 with the access data signatures in the partner ASIC (not shown in FIG. 4) also increases the probability of error detection (see DE 100 37 992). In addition to the elements already described with reference to FIG. 3, two linear feedback shift registers LFSR 60 are also required for this. One LFSR 60 is used to form the signature 5 of the write data, the other LFSR 60 to form the signature 5 of the read data of the memory unit. With linear feedback shift registers specific bits of the shift register are fed back to the input via an XNOR gate.

The method proposed here for testing memory units is particularly suitable for detecting errors during the address process, particularly for detecting what are known as coupling errors. Coupling errors refer to unwanted coupling between two or a plurality of storage locations. Coupling error detection is generally very time-consuming and the time required for testing increases quadratically with the number of storage locations n with the hitherto known methods. The test architecture proposed here is simple to set up and can be incorporated easily in the previously described online test concept. This means that a security requirement up to AK 4 (according to DIN 19250/19251) or SIL 2 to 3 (according to IEC 61508) can be achieved. The concept can be used both with single-channel and dual-channel architecture.

Figure 5:
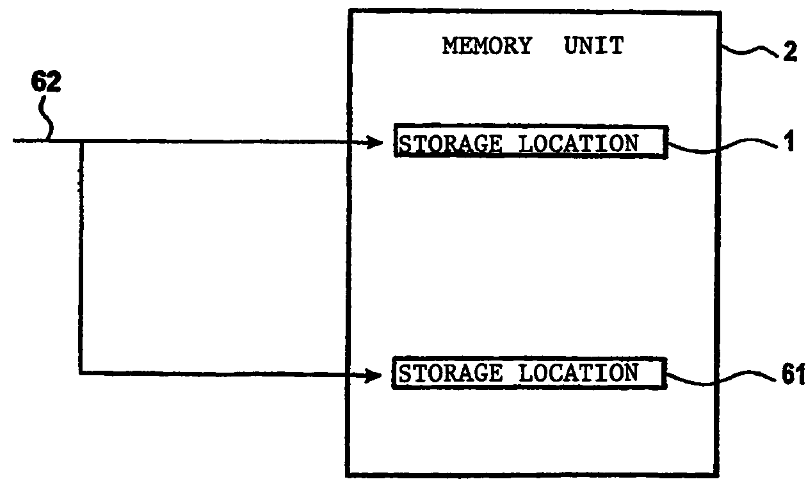
FIG. 5 shows a scenario of what are known as coupling errors.

Coupling errors between storage locations (known as vertical coupling errors) are very complex. The known test methods are for the time being limited to detecting simple coupling errors. FIG. 5 shows a typical scenario of a coupling error. It shows a memory unit 2 with storage locations 1, 61, which can be accessed via a connection 62. In the case of a coupling error the addressed and selected storage locations are not the same. The addressed storage location is also referred to below as the coupling location and the selected storage location as the coupled location. If a first storage location 1 is addressed but a second storage location 61 is accessed, the first storage location 1 remains inaccessible, if no further error sources exist. Read or write access to the first storage location 1 operates in a formally correct manner but its content is however not touched. In order to locate such errors, the entire memory unit is generally prefilled with a known pattern (e.g. 55'X or AA'X).

The memory unit content is then inverted address by address and the entire memory unit is tested for correct data content. Known tests based on this method are Walkpat and Galpat. The time required for testing with these methods increases in proportion to the square of the number n of storage locations. Methods of this type are not suitable for online tests, as on the one hand the current memory unit content is destroyed by the test and on the other hand the test time increases drastically with memory unit size and therefore in some circumstances a complete test of the memory unit cannot be carried out within a predefined time. Coding the data (memory unit content) helps here. With the above-mentioned error the data is actually not corrupted but simply incorrectly assigned. Such errors can only be detected, if the address is included in the code formation. Parity represents the simplest and, as far as information rate is concerned, the most effective coding. A hundred percent of one-bit errors can be detected with parity. The inclusion of parity as one of the coding options for detecting coupling errors improves the overall situation but it is still unsatisfactory. The effectiveness of parity can however be increased drastically by using a variable parity VP, e.g. an address-dependent parity.

All coupling errors of the above-mentioned type can then be detected. The introduction of a variable parity VP has the distinct advantage that the address does not necessarily have to be included when parity is formed. Error analysis without reference to the address is even simplified and becomes transparent. With memory units organized by bytes one additional bit is required (i.e. 12.5% memory unit overhead) or a one bit data reduction from eight to seven. The coupling error is essentially detected when the parities of the coupling location and the coupled location are different.

TABLE 1

| Address | MSB A3 | A2 | A1 | LSB A0 |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |
| 11 | 1 | 0 | 1 | 1 |
| 12 | 1 | 1 | 0 | 0 |
| 13 | 1 | 1 | 0 | 1 |
| 14 | 1 | 1 | 1 | 0 |
| 15 | 1 | 1 | 1 | 1 |
| Test cycle | 1 | 2 | 3 | 4 |

For the purposes of clarity the method proposed here will be clarified using the example of a 16-byte memory unit. Four address bits are required to represent the entire address space of this memory unit. Any storage location can be addressed with a 4-bit counter (e.g. address counter 50 in FIG. 3 and FIG. 4). The sixteen states of this counter are compiled in Table 1. To detect the coupling error fully, each address pair must be given a different parity at least once.

The memory unit test is controlled by means of a state machine (FSM). The state machine visits all the addresses from 0 to 15. With the test described here one of the address bits is used as variable parity VP. In the case in question a maximum of four test cycles then results with the cycle-dependent variable parity VP. In the first test cycle the variable parity VP is derived from MSB (Most Significant Bit), i.e. bit $A_3$ of the address. In the example, let $A_3$='0'0 be the even parity and $A_3$='1' be odd parity. As can be seen from Table 1, half of the storage locations in this test cycle have even parity and the other half have odd parity. This is the case for all test cycles. In the first test cycle the storage locations of the upper half of the memory unit (addresses 0 to 7) have even parity, while the storage locations of the lower half of the memory unit (addresses 8 to 15) have odd parity. All coupling errors considered in pairs, between any address from the upper group and any address from the lower group, are always detected. Mutual coupling errors in the upper half (with $A_3$=0) or in the lower half (with $A_3$=1) are not detected. Half of the undetected coupling errors in the two ranges are detected in the second test cycle, in which variable parity is represented by the address bit $A_2$. Half of the hitherto undetected coupling errors are then detected in each further test cycle. In the last test cycle with address bit $A_0$ (LSB=Least Significant Bit) as variable parity VP all hitherto undetected coupling errors are finally detected. In this way all coupling errors of the above-mentioned type are detected in few clock pulses (number of required clock pulses not quadratic but simply proportional to the number of storage locations times number of address bits) and with less additional hardware.

The proposed memory unit test therefore comprises two phases. In the first phase the basic test described above is carried out. The storage locations are thereby verified for the write, read and store processes. This basic test is extended so that the original memory unit content written back in the sixth clock pulse 36 is now written back with the variable parity of the current test cycle according to Table 1. In the second phase, after writing back the entire memory unit with variable parity with functional data, the memory unit is once again read in full and the parity of the data is compared with the variable parity VP (parity definition by address bit $A_{(4.1)}$ in the ith cycle). The second phase only requires two clock pulses per storage location, one clock pulse for reading and one clock pulse for comparing the dada and incrementing the address counter (both tasks could be completed in one clock period). During the course of the memory unit test as described above, the memory unit was processed upwards (starting with the address 0). However if the coupled storage location has a higher address than the coupling location (see FIG. 5), its data is overwritten once again with variable parity VP at a later time during the course of phase processing. To detect this coupling error the first and second phases have to be repeated again, whereby this time the memory unit is processed downwards (starting with the address n). The second phase thereby operates without change. The first phase requires a total of 8*n clock pulses. The second phase requires a further 2*n clock pulses, so the two phases together require 10*n clock pulses. To process the memory units in descending address order it is possible to omit writing and reading the memory unit with the data 55'X and AA'X. In this case the first phase can be limited to three clock pulses:

Reading the current data SP'X (functional data)

Writing the data with variable parity

Decrementing the address counter (next address)

Maximum (3+2)*n=5*n clock pulses are required for the downward processing of the memory unit. Therefore a maximum total of 15*n clock pulses is required for a test cycle with a variable parity pattern, defined by one of the address bits $A_i$. One test cycle essentially comprises two test runs, i.e. two segments, one with ascending and one with descending address order. An address space with m address bits, whereby $$m=\log_2 n$$

applies, therefore requires maximum (15*n*m) clock pulses in total.

For time-critical applications it is possible even to omit the first phase completely with test cycles 2 to m. In this case maximum (10*n*m+5*n) clock pulses are required for a full memory unit test. This maximum number of (10*n*m+5*n) clock pulses can be reduced significantly, if variable parity VP is always used according to the method described above. In other words parity is defined by the respective address bit $A_i$, according to the test cycle, even in functional operation. In this case the three clock pulses (reading, writing with variable parity and decrementing the address counter) are not required for the cycle with descending address order. 12*n clock pulses rather than 15*n clock pulses are then required for the first test cycle. 4*n clock pulses per cycle are then required for the further cycles (2*n for the ascending and 2*n for the descending address order, in each instance for the second phase, the first phase is omitted). Therefore a maximum total of (4*n*m=8*n) clock pulses is required for a full memory unit test. The advantage of the faster test run (gain approx. 60%) must be balanced against higher software costs. The software in this case must always carry the parity-defining address bit $A_i$ with it and use it to determine current parity. This problem can however be resolved relatively easily, if a variable parity bit is used internally, as described above. However during read access a manipulated parity bit, which is formed by an ex-or link of $A_i$ and the variable parity bit and produces a fixed parity FP (in the case in question even parity), is made available externally. During write access the parity bit supplied by the software with fixed parity FP (in the case in question even parity) is converted internally by an ex-or link with the parity-defining address bit $A_i$ to variable parity VP. The parity bit thus obtained is then transferred to the memory unit. Two additional ex-or gates are required for this, as shown in Table 2.

TABLE 2

| Parity-defining address bit $A_i$ | Data Dx DG = even parity Du = odd parity | Variable parity VP | Formation of fixed parity FP (even) during read access $FP = A_i \oplus VP$ | Formation of variable parity VP during write access $VP = A_i \oplus FP$ |
|---|---|---|---|---|
| 0 | Dg | 0 | 0 | 0 |
| 1 | Dg | 1 | 0 | 1 |
| 0 | Du | 1 | 1 | 1 |
| 1 | Du | 0 | 1 | 0 |

If a variable parity VP is always used (even in functional mode), with the basic test concept described above during read access the read parity must be compared with the current variable parity, determined by including the parity-defining address bit $A_i$. This comparison takes place during all read access operations, except in the first clock period of the basis test, as after power-on the memory unit is filled with random data and the parity is invalid. During write access the variable parity VP is formed with the inclusion of the parity-defining address bit $A_i$ and transferred to the memory unit with the data.

Figure 6:
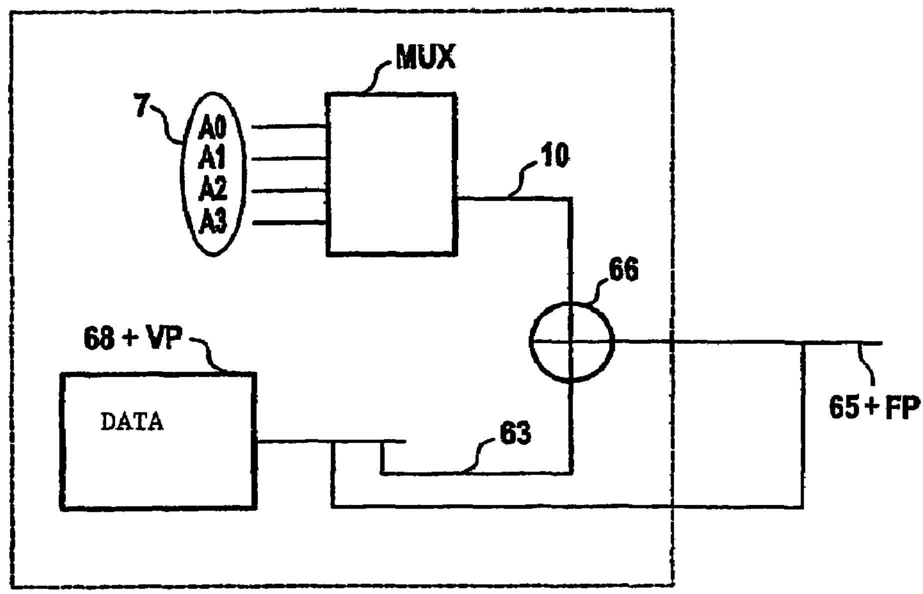
FIG. 6 shows internal data processing during the read process with fixed parity and FIG. 7 shows internal data processing during the write process with fixed parity.
Figure 7:
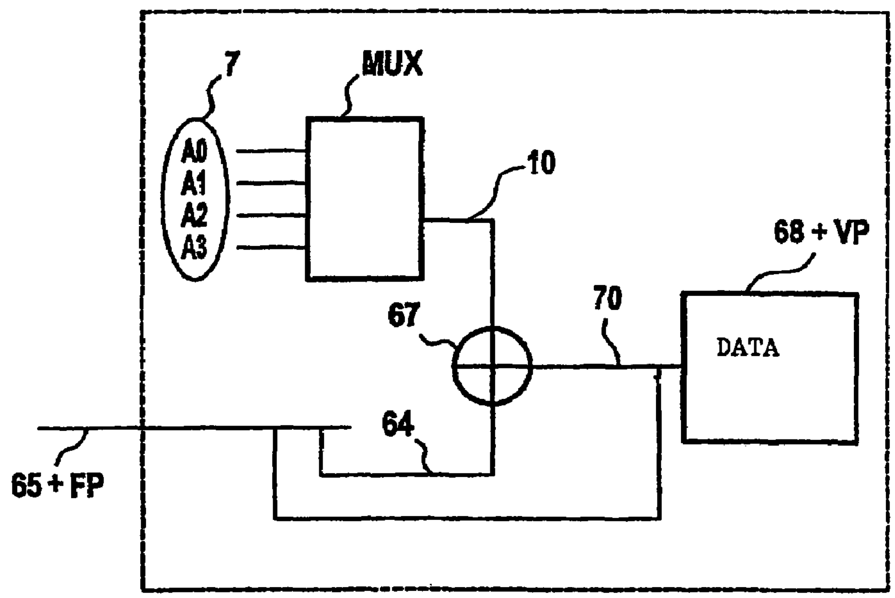

FIG. 6 and FIG. 7 show the hardware required for memory unit access in functional operation, if variable parity is always used internally. FIG. 6 shows the internal data processing during the read process. A data 68 with a variable parity VP is stored in one storage location. During read access to this storage location, e.g. by external software, however it is not the data 68 with variable parity VP that is produced but the data 65 with a fixed parity FP. A parity-defining address bit 10 is selected for this purpose internally, i.e. within the hardware circuit, from the address bits 7 of the memory unit address of the respective storage location using a multiplexer MUX. This address bit 10 is ex-or linked in an ex-or gate 66 to the variable parity bit 63 of the data 68. The result of this ex-or link is a fixed parity bit 69, which is used to form the external data 65. The reading software therefore does not see the variable parity VP but can work with datas with a fixed parity FP.

In the case of the write process, an external data 65 with a fixed parity FP is present and is to be stored in the memory unit in a storage location. A multiplexer MUX is used to select a parity-defining address bit 10 from the address bits 7 of the memory unit address of the respective storage location. This address bit 10 is ex-or linked in an ex-or gate 67 to the fixed parity bit 64 of the data 65. The result of this ex-or link is the variable parity bit 70, which is used to form the internal data 68. This internal data 68 with the variable parity VP is stored in a storage location. The hardware described with reference to FIG. 6 and FIG. 7 maps the processes described above with reference to Table 2. The parity-defining address bit 10 thereby corresponds to the address bit $A_i$ mentioned above.

Advantages of the test method described here are summarized once again. The time required for the test increases in proportion to the number of storage locations n multiplied by $m=\log_2 n$ and not quadratically with the address space n as with hitherto known standard tests. Even with a 1 kB memory unit this means a reduction in the number of clock pulses by the factor one hundred. Instead of 1024 with the hitherto known methods, the multiplicator with the method proposed here is only $\log_2 1024=10$. As the size of the memory unit increases, the algorithm described here can be used very profitably compared with known methods, as the time required for the test decreases exponentially with the increase in the memory unit. All simple coupling errors of the basic type are detected. The method is also able to detect multiple coupling errors. The method is simple to carry out and simple to implement and can therefore also be profitably used for the production test. The algorithm proposed here can be interrupted without any problem at any point and can therefore be particularly advantageously used in the context of the online test concept described above, with which it is possible to change between test operation and functional operation at any point with this method. The sole disadvantage is that an additional bit is also required for parity.

In functional mode the user can choose whether to operate with a fixed parity or without parity. In both cases the variable parity is used internally. To carry out a full memory unit test, maximum (4*n*m+8*n) clock pulses are required for a memory unit with n storage locations. As in both cases the same number of clock pulses is required for a full test, it is recommended that a fixed parity be used. In this case a random error occurring during functional operation can be detected immediately when the memory unit is read.

For better clarity a synchronous, static and unidirectional memory unit was considered in the description. Essentially the method described here can however be used for any type of memory unit with corresponding modification. Therefore an asynchronous memory unit can be operated as a synchronous memory unit by means of a small additional logic at the inputs or outputs, which supplies the memory unit with data (address, data and control signals) with clock pulse control. With a dynamic memory unit it must be ensured that the refresh cycles are taken into account during the memory unit test. A bi-directional memory unit can be operated as a unidirectional memory unit by adding an input or output latch at the data port. Multiport memory units can be tested with the same method, whereby the memory unit test is only carried out for individual ports or consecutively for each port. All the said memory units can be in the form of ASICs (Application Specific Integrated Circuits) or part of such.

To summarize, the invention therefore relates to a method and a device for testing and/or operating memory units, which make it possible to conduct a time-saving test of semiconductor memories during running operation. The inventive method for testing memory units 2 having storage locations 1 provides that, for the storage locations 1, a first item of test information is formed according to a variable parameter assigned to the respective storage location 1 and according to the content of the respective storage location 1.

The invention claimed is:

1. A method for testing memory units having storage locations, comprising:

forming for the storage locations a first item of test information according to a variable parameter assigned to the respective storage location and according to the content of the respective storage location, wherein in the first phase of a test cycle at each storage location of the memory unit;

loading predetermined first output data and predetermined second output data into a FIFO;

reading and transferring an original content of the storage location to a register at the output of the memory unit;

transferring the read original content from the register to the FIFO and writing the first output data of the FIFO into the storage location;

reading again the content of the storage location, transferring the content to the register at the output of the memory unit and comparing the content with the first output data of the FIFO;

transferring the read content from the register to the FIFO and writing the second output data of the FIFO into the storage location;

reading again the content of the storage location, transferring the content to the register at the output of the memory unit and comparing the content with the second output data; and transferring the read content from the register to the FIFO and writing the original content from the FIFO into the storage location.

2. A method for testing a memory unit having a plurality of storage locations for storing memory values, comprising:

providing a queue having a plurality of storage locations; and providing a first phase of a test cycle, wherein in the first phase comprises:

loading a predetermined first queue value and a predetermined second queue value into a queue;

reading an original memory value at a first address of the memory unit, writing the original memory value to an input of the queue, writing the first queue value from an output of the queue at the first address, comparing a second memory value at the first address to the first queue value in the output of the queue, writing the second memory value to the input of the queue, writing the second queue value from the output of the queue at the first address, comparing a third memory value at the first address to the second queue value in the output of the queue, whereby in the first phase a storage location at the first address of the memory unit is written and read to detect memory errors.

3. The method according to claim 2, further comprising updating the input and output locations in accordance with a First-In-First-Out queue.

4. The method according to claim 2, wherein the first address is updated to a subsequent address in the memory unit and the first phase of the test cycle is repeated with the updated first address or wherein the first address is updated to a previous address in the memory unit and the first phase of the test cycle is repeated with the updated first address, whereby the plurality of storage locations of the memory unit is written and read to detect memory errors.

5. The method according to claim 2, wherein the method is provided during functional operation of memory unit.

6. The method according to claim 2, wherein after the end of the first phase a content of the storage location at the first address is the original memory value.

7. The method according to claim 2, further comprising in the first phase forming for the storage location a first item of test information according to a variable parameter and according to the content of the storage location.

8. The method according to claim 7, wherein after the first phase the variable parameter includes a variable parity.

9. The method according to claim 7, further comprising a second phase of a test cycle to detect coupling errors, wherein a number of test cycle corresponding to a number of address bits of the memory address represented in a binary manner unit is provided and a different address bit is used in each test cycle to vary a variable parity value, whereby a coupling error is an unwanted linking between two or more storage locations in the memory unit address.

10. The method according to claim 9, wherein a different address bit is used as variable parity in each test cycle to form the first item of test information.

11. The method according to claim 7, further comprising in a functional operation:

during the read of the storage location:

forming a fixed parity bit by an ex-or link of a parity-defining address bit of the respective memory unit address to the first item of test information;

during a write of the storage location:

forming the first item of test information by an ex-or link of the fixed parity bit to the parity-defining address bit.

12. A device for detecting memory errors in a memory unit, comprising:

a memory unit having a plurality of storage locations;

a First-in-and First-Out (FIFO) queue having a plurality of storage locations, the queue coupled to the memory unit;

an address counter having an address of a storage location within the memory unit, the address counter coupled to the memory unit;

a register coupled to the memory unit, and the queue;

a comparator for comparing values in the register and the queue;

a state machine for testing memory in the memory unit coupled to the memory unit, the address counter, the register, and the queue, wherein for a first phase of a test cycle the state machine loads a predetermined first queue value and a predetermined second queue value into the FIFO queue;

reads a first memory value from the memory unit at the location indicated by the address counter and stores the first memory in the register, stores the register value in the input location of the queue, reads the first queue value from the output location of the queue and stores queue value in the memory unit at the location indicated by the address counter, reads a second memory value from the memory unit at the location indicated by the address counter and stores the second memory in the register, compares a second memory value in the register to the first queue value, stores the register value in the input location of the queue, reads the second queue value from the output location of the queue and stores the second queue value in the memory unit at the location indicated by the address counter, reads a third memory value from the memory unit at the location indicated by the address counter and stores the third memory in the register, compares a third memory value in the register to the second queue value, wherein the address counter is updated, whereby during the first phase the storage locations in the memory unit is written and read to detect memory errors.

* * * * *